(12) United States Patent
Hecker et al.

(10) Patent No.: US 12,359,701 B2
(45) Date of Patent: Jul. 15, 2025

(54) MECHANICAL WEAR GAUGE

(71) Applicant: ZF CV Systems Europe BV, Brussels (BE)

(72) Inventors: Jannis Hecker, Heidelberg (DE); Bernward Redemann, Hockenheim (DE); Vitalij Scherer, Leimen (DE)

(73) Assignee: ZF CV Systems Europe BV, Brussels (BE)

( * ) Notice: Subject to any disclaimer, the term of this patent is extended or adjusted under 35 U.S.C. 154(b) by 451 days.

(21) Appl. No.: 17/986,120

(22) Filed: Nov. 14, 2022

(65) Prior Publication Data

US 2023/0151866 A1 May 18, 2023

(30) Foreign Application Priority Data

Nov. 16, 2021 (DE) ...................... 10 2021 129 799.0

(51) Int. Cl.
*F16D 66/02* (2006.01)
*B60T 17/22* (2006.01)

(52) U.S. Cl.
CPC ............ *F16D 66/02* (2013.01); *B60T 17/221* (2013.01)

(58) Field of Classification Search
CPC ............................... F16D 66/02; B60T 17/221
USPC .................................................. 33/609, 610
See application file for complete search history.

(56) References Cited

U.S. PATENT DOCUMENTS

| | | | | |
|---|---|---|---|---|
| 2,769,241 A | * | 11/1956 | Barrett | G01B 5/08 33/679.1 |
| 2,972,192 A | * | 2/1961 | Atzberger | G01B 5/0028 33/795 |
| 3,190,006 A | * | 6/1965 | Madeira | B60T 17/221 33/610 |
| 3,745,661 A | * | 7/1973 | Atzberger | G01B 5/08 33/795 |
| 3,827,153 A | * | 8/1974 | Mitchell | G01B 5/0028 33/42 |
| 4,520,568 A | * | 6/1985 | Drenner | G01B 5/0028 33/794 |
| 5,035,303 A | * | 7/1991 | Sullivan | F16D 66/02 188/72.3 |
| 5,261,512 A | * | 11/1993 | Young | F16D 69/0416 188/264 G |

(Continued)

FOREIGN PATENT DOCUMENTS

| | | |
|---|---|---|
| DE | 7117056 U | 1/1972 |
| DE | 2143660 A1 | 3/1973 |

(Continued)

*Primary Examiner* — George B Bennett
(74) *Attorney, Agent, or Firm* — Dickinson Wright PLLC

(57) ABSTRACT

A mechanical wear gauge for detecting a brake liner wear and a brake disc wear of a disc brake for vehicles, in particular for utility vehicles, includes a brake liner wear detection mechanism and a brake disc wear detection mechanism. Brake liners and brake discs are subjected to a wear so that the brake liner thickness and the brake disc thickness decrease with an increasing period of use. A base member includes an arm member having a pincer leg. A first sliding member having a pincer leg is slidable relative to the base member and arm member to detect brake disc wear. A second sliding member, extending parallel to the first sliding member, is slidable relative to the base member to detect brake liner wear.

20 Claims, 2 Drawing Sheets

(56) References Cited

U.S. PATENT DOCUMENTS

| | | | | |
|---|---|---|---|---|
| 5,465,501 A * | 11/1995 | Rogler | G01B 5/14 |
| | | | 33/810 |
| 5,535,854 A * | 7/1996 | Prince | F16D 65/60 |
| | | | 188/1.11 R |
| 5,970,427 A * | 10/1999 | Greenwald | G01B 21/08 |
| | | | 702/33 |
| 6,390,244 B1 * | 5/2002 | Sitter | F16D 66/02 |
| | | | 188/1.11 W |
| 6,477,893 B1 * | 11/2002 | Djordjevic | F16D 66/02 |
| | | | 73/129 |
| 6,478,119 B2 * | 11/2002 | Fujiwara | F16D 66/02 |
| | | | 188/1.11 W |
| 7,040,151 B2 * | 5/2006 | Graham | G01B 5/0028 |
| | | | 73/121 |
| 8,118,142 B2 * | 2/2012 | Redemann | F16D 55/02 |
| | | | 188/73.39 |
| 8,826,557 B2 * | 9/2014 | Yang | G01B 3/20 |
| | | | 33/808 |
| 9,500,462 B2 * | 11/2016 | Reble | G01B 5/0028 |
| 9,983,000 B2 * | 5/2018 | Malmsheimer | F16D 66/028 |
| 10,041,556 B2 * | 8/2018 | Cavalli | G01B 11/167 |
| 10,508,894 B2 * | 12/2019 | White | B60T 17/221 |
| 11,215,436 B2 * | 1/2022 | Huang | G01B 5/06 |
| 11,655,869 B2 * | 5/2023 | Heman | F16D 65/58 |
| | | | 188/79.55 |
| 2006/0076195 A1 * | 4/2006 | Salazar | F16D 66/02 |
| | | | 188/1.11 R |
| 2008/0189971 A1 * | 8/2008 | Wo | G01B 5/08 |
| | | | 33/784 |
| 2009/0084638 A1 * | 4/2009 | Masterson | F16D 66/02 |
| | | | 188/1.11 W |
| 2016/0084626 A1 * | 3/2016 | Reble | G01B 5/0028 |
| | | | 33/609 |
| 2019/0136928 A1 * | 5/2019 | Prouzet | F16D 66/028 |
| 2019/0225202 A1 * | 7/2019 | Juzswik | F16D 65/14 |
| 2019/0226542 A1 * | 7/2019 | Lin | F16D 66/028 |

FOREIGN PATENT DOCUMENTS

| | | |
|---|---|---|
| DE | 2734786 A1 | 2/1979 |
| DE | 2749773 A1 | 5/1979 |
| DE | 3237274 C1 | 10/1983 |
| DE | 3305386 C1 | 3/1984 |
| EP | 1447587 A1 | 8/2004 |
| KR | 20130093933 A | 8/2013 |

* cited by examiner

MECHANICAL WEAR GAUGE

FIELD

The invention relates to a mechanical wear gauge for detecting a brake liner wear and a brake disc wear of a disc brake for vehicles, in particular for utility vehicles.

BACKGROUND

Brake liners and brake discs are subjected to a wear such that the brake liner thickness and the brake disc thickness decrease with an increasing period of use. A main cause of the brake liner wear and the brake disc wear are deposits in the form of particles of dirt on the brake disc and the brake liner, which lead to undesirable brake noises and an inadequate brake power. At the latest when reaching a wear limit, a replacement of the said components is required. Otherwise, the braking action of the vehicle decreases significantly and emergency braking is no longer possible. In order to establish the brake liner wear, brake liner wear sensors, which notify the driver via an output in the driver's cab as soon as the wear limit is reached, are mainly used. The wear on brake discs can, inter alia, be detected by way of optical sensors. In disc brakes which have no sensor system for measuring the brake liner wear and for identifying the brake disc wear, the measurement must be carried out mechanically. For a mechanical wear measurement of the brake disc and the brake liners, the wheel must be removed from the vehicle axle because the disc brake is arranged at the rim side behind the wheel. Such a mechanical measuring device for a brake disc is disclosed in EP1447587A1. The brake disc has on the outer circumference and on the inner circumference thereof a wear marking in the form of a step-like shoulder. The measuring device is in the form of a bridge and performs the function of a depth gauge by the measuring device being placed in the step-like shoulders. In the event of a non-uniform wear, the measuring device is not arranged parallel with the brake disc. The wear is determined by way of a separate sensor which is guided on the bridge of the measuring device.

KR20130093933 discloses a mechanical wear gauge for the brake liners. The measuring device is in the form of a screwdriver. A wear scale is arranged in the handle. A measuring needle which is guided by way of springs is arranged partially in the handle and a receiving member which is connected to the handle. In order to measure the brake liner wear, the receiving member is supported on the edge of a recess of the liner carrier. Afterwards, the measuring needle is guided through the recess of the brake liner until it strikes the brake disc. Via the measurement scale, the thickness of the brake liner can subsequently be read.

A measurement of the wear limits during travel operation is possible only in an adequate manner without time being spent in a workshop. Even in a workshop, the verification of the wear limits of the brake liners and the brake disc without installed wear sensors requires a considerable amount of time since each wheel has to be disassembled and assembled again.

SUMMARY

An object of the present disclosure is to provide a mechanical measuring device that, with a minimal amount of time being taken and without the disassembly of a vehicle wheel, can measure a brake liner wear and a brake disc wear.

The object is achieved in that the mechanical wear gauge has an element for detecting a brake liner wear and an element for detecting a brake disc wear. The mechanical measuring device measures, one after the other, the brake disc thickness and the brake liner thickness, wherein the brake liner thickness is measured indirectly by way of the brake caliper. That is to say that the brake liner thickness is measured via the displacement of the brake caliper in the direction of the brake disc as occurs from the wear-related reaction-side brake liner. The brake liner facing the rim of the wheel is defined as the reaction-side brake liner. The brake liner facing away from the rim of the wheel is defined as a brake-application-side brake liner. The advantage of the mechanical measuring device according to the invention is that it requires only a mechanical tool by way of which in one working step, on a vehicle, the brake liner thickness and the brake disc thickness can be measured.

In another advantageous embodiment, it has been found that the wear measurement of the brake liner thickness and the wear measurement of the brake disc thickness can be carried out without disassembly of a wheel from a vehicle axle. With the mechanical measuring device, without any time being spent in a workshop, the wear measurements which mentioned herein can be carried out by the driver or another person. The mechanical wear gauge is guided for wear measurement from the rim side between the brake carrier and the brake caliper on the brake disc.

In another embodiment, the mechanical wear gauge includes a base member and two sliding members which are arranged parallel on the base member and which can be moved axially along a longitudinal axis of the base member. The base member is constructed to be square. However, it may have any other geometric shape. Furthermore, the base member performs a plurality of tasks. The base member acts as a handle for the user of the mechanical wear gauge. Furthermore, the base member performs the task of the output device for reading the brake liner thickness in the actual state and the brake disc thickness in the actual state. In addition, the base member has receiving locations for fixing the movable sliding members. The sliding members may be replaced in the event of wear or a breakage. A complete replacement of the mechanical wear gauge is not required. Furthermore, the base member and the movable sliding members form a compact space-saving construction because the base member combines three functions in one component.

In one aspect of the present disclosure, a fixed measuring arm, which is configured to measure the brake disc thickness, is arranged on the base member axially in the overlap region of the movable sliding member. The measuring arm and the base member form one component. The movable sliding member is arranged radially below the measuring arm. The measuring arm and the movable sliding member together form a measuring device which is also referred to as a sliding measurement member. The movable sliding member, which is arranged in the overlap region of the measuring arm, has a projection which is configured for the movable sliding measurement member to be guided axially along the longitudinal axis of the base member by the user.

In one aspect of the disclosure, the measuring arm has a pincer leg which is arranged at the end of the measuring arm opposite the base member. The sliding member which is arranged in the overlap region of the measuring arm has, parallel with the first pincer leg, a second pincer leg, wherein the first pincer leg and the second pincer leg are constructed to receive a brake disc in the axial direction thereof and to surround the brake disc during the wear measurement operation. The brake disc is clamped by way of the pincer legs and a precise measurement of the wear of the brake disc is enabled because the mechanical wear gauge cannot slide on the base member during the reading of the wear, that is to say, the wear gauge remains in position.

It has further been shown that the sliding member for measuring the brake liner thickness can be fixed to the base member by means of two fixing screws. The measuring arm has, for each fixing screw, an opening in the form of an elongate hole, through which the two fixing screws are inserted and can lock the movable sliding member against an axial displacement of the measuring arm in the longitudinal direction thereof when the fixing screws are tightened. The number of fixing screws is not limited and may vary depending on the size of the base member and depending on the size of the movable sliding member. The fixing of the movable sliding member by way of the fixing screws ensures precise reading of the brake disc wear, because the movable sliding member cannot axially slide after the fixing screws are tightened. In particular, knurled screws are suitable as fixing screws.

In another embodiment, the base member has a brake disc wear indicator having a brake disc wear scale which is configured for readability of the brake disc wear by the user. The brake disc wear indicator is in the form of an elongate hole in the base member and arranged in the overlap region of the movable sliding member in order to measure the brake disc thickness. For better readability, the base member is colored a different color from the movable sliding member arranged in the overlap region of the measuring arm and in the overlap region of the base member. The brake disc wear scale is formed along the brake disc wear indicator and indicates the range from the maximum brake disc thickness to the minimum brake disc thickness. On the movable sliding member, a marking is placed in the visible region of the brake disc wear indicator. The marking shows in combination with the brake disc wear scale the spacing between the pincer legs or in other words the width of the brake disc. A more cost-intensive digital output device is not required.

In another aspect of the disclosure, the base member has a brake liner wear indicator having a brake liner wear scale which is configured for reading the brake liner wear by the user. The brake liner wear indicator is arranged with respect to the longitudinal axis of the base member at the side of the base member opposite the brake disc wear indicator. The brake liner wear indicator is in the form of an elongate hole. The maximum wear rate of the brake liner is greater than the maximum wear rate of the brake disc, for which reason the elongate hole which is in the form of a brake liner wear indicator is greater in the longitudinal direction than the elongate hole of the brake disc wear indicator. A marking applied inside the brake liner wear indicator on the movable sliding member in order to measure the brake liner wear shows, in combination with the brake liner wear scale, the current brake liner wear. A more cost-intensive digital output device is not required. In addition, the brake liner wear indicator and the brake disc wear indicator are non-sensitive to dirt and easy to clean because the movable sliding members can be removed from the base member having the brake liner wear indicator and the brake disc wear indicator.

In an advantageous aspect of the disclosure, the end of the movable sliding member opposite the base member for measuring the brake disc wear is in the form of a hook. The movable sliding member is a punched component and the hook is flattened in the direction of the bolt cover of the disc brake.

In one aspect, the flattened portion is in the form of a contact face. The contact face of the hook is used for abutment against the bolt cover. The movable sliding member cannot slide counter to a localized abutment as a result of the contact face of the hook on the bolt cover, and the movable sliding member remains in position inside the wear measurement member.

In another embodiment, the base member has a resilient connection at the side opposite the measuring arm, wherein the sliding member for measuring the brake liner wear is fixed to the base member by way of the resilient connection. The resilient connection has two or more resilient elements which are formed by the base member. The resilient elements have a radial pretensioning and press the sliding member for measuring the brake liner wear against the base member. The pretensioning of the resilient elements is only so strong that the sliding member for measuring the brake liner wear remains axially movable in the longitudinal direction thereof. The resilient connection is inexpensive and requires no additional components. In addition, the movable sliding member for measuring the brake liner wear can be easily replaced by the sliding member being pressed counter to the pretensioning force, that is to say, counter to the direction of the base member, and removed.

In one aspect, the mechanical wear gauge is produced from metal or plastics material depending on requirements. The base member having the measuring arm and the sliding members may be produced from a metal sheet, that is to say, from a flat rolled metal. Metal sheets have the advantage that they can be produced with different thicknesses and can be readily processed. The sliding members and the base member having the measuring arm may, for example, be produced by way of punching from the metal sheet. It is also conceivable for the mechanical wear gauge to be produced from plastics material by means of an injection-molding method. The fixing screws can also be produced by means of injection-molding methods. The mechanical wear adjustment device made of plastics material is particularly light and has no sharp edges which could damage another component.

In one aspect, the mechanical wear gauge has an overall thickness between 5 mm and 15 mm, preferably between 5 mm and 10 mm, and can be easily transported or, for example, stored in a space-saving manner in a tool compartment of a vehicle. In addition, as a result of its small overall thickness, the mechanical wear gauge can be moved along the vehicle axle and brake disc components into the starting position thereof in order to measure the brake liner wear or to measure the liner thickness of the brake disc without having to disassemble components of the vehicle axle or the brake disc.

In another embodiment according to the present disclosure, a vehicle has a vehicle axle and a wheel which is arranged on the vehicle axle, wherein the wheel has a disc brake, two brake liners, and a brake disc which is arranged between the brake liners, and the wear of the brake liners or the brake disc is measured by way of a mechanical wear gauge. The mechanical wear adjustment device is constructed in accordance with the description below and the preceding described embodiments. The vehicle is preferably a heavy or light utility vehicle.

BRIEF DESCRIPTION OF THE DRAWINGS

Selected embodiments of the invention will be explained below with reference to the appended Figures.

In the drawings.

DETAILED DESCRIPTION

Figure 1:
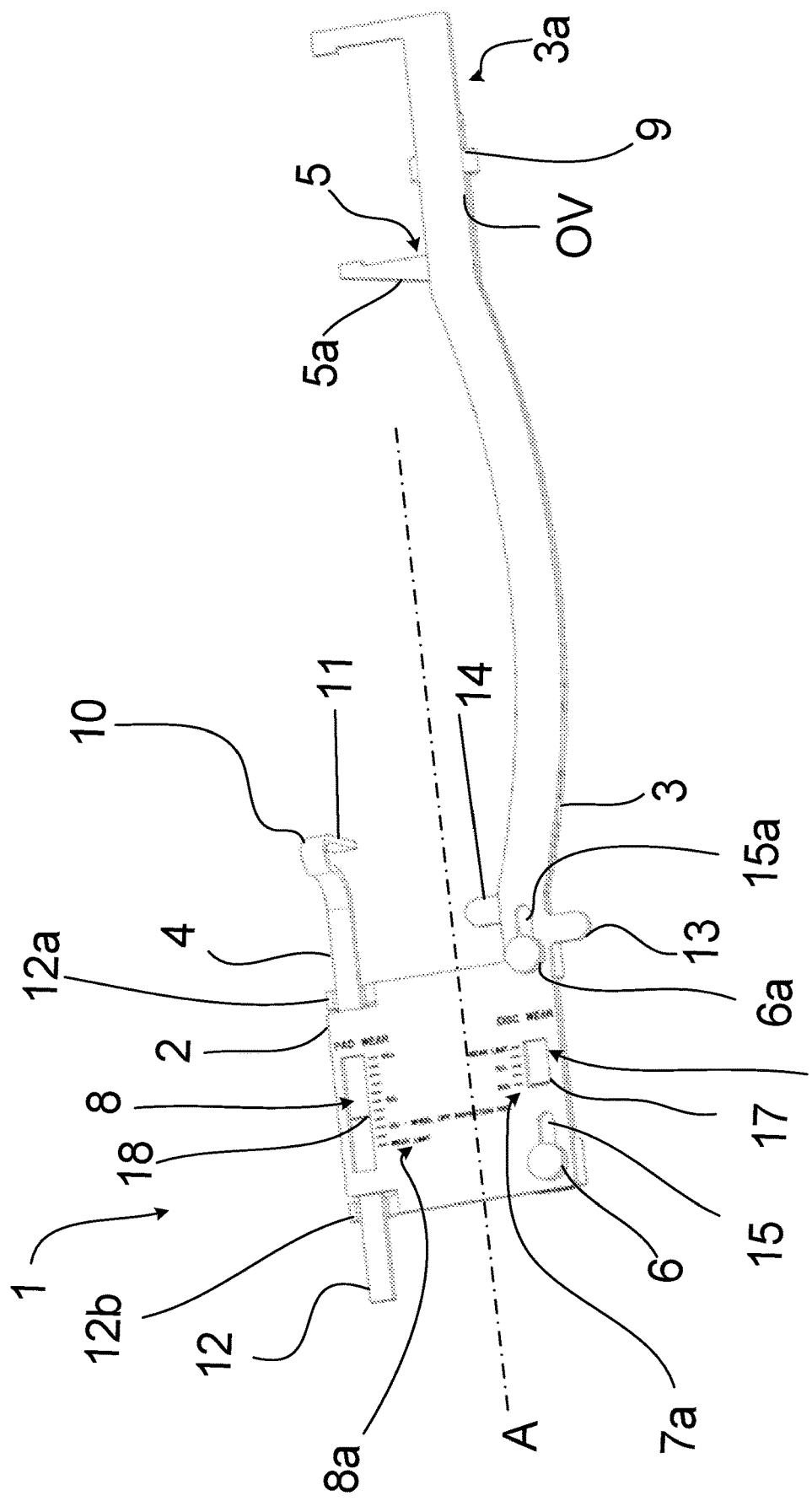
FIG. 1 shows a mechanical wear gauge according to the invention in a laterally rotated plan view.
Figure 2:
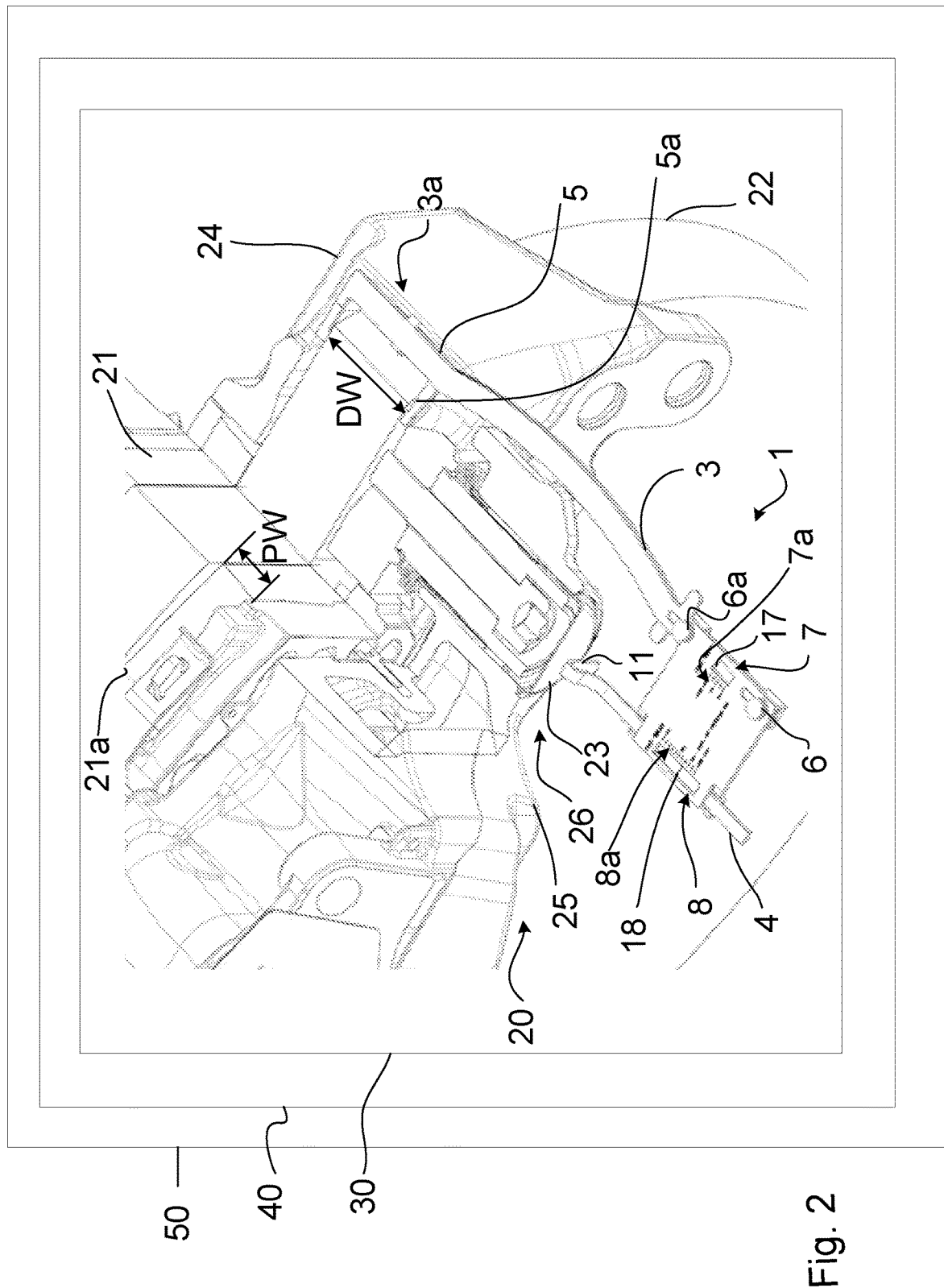
FIG. 2 shows a mechanical wear gauge during a measurement operation on a sectioned disc brake of a wheel.

FIG. 1 shows the mechanical wear gauge 1 according to the invention in an initial state thereof, that is to say, prior to the measurement operation. The mechanical wear gauge 1 is formed from a metal sheet and has a base member 2 having a measuring arm 3 which is formed on the base member 2. The measuring arm 3 extends along a longitudinal axis A of the base member 2 and has at the end of the measuring arm 3 opposite the base member 2 a pincer leg 3a. The pincer leg 3a is arranged with respect to the measuring arm 3 coaxially on the measuring arm 3. Furthermore, a sliding member 5, referred to also as a first sliding member 5, for measuring a brake disc wear DW shown in FIG. 2 is arranged in an overlap region OV of the measuring arm 3. The sliding member 5 further comprises a second pincer leg 5a of the mechanical wear gauge 1. The pincer leg 5a of the sliding member 5 is arranged opposite the pincer leg 3a of the measuring arm 3. Together, the pincer legs 3a, 5a form a set of pincers which can engage around a brake disc 22 (see FIG. 2) in terms of the width or the thickness thereof. The sliding member 5 is axially movable in the longitudinal direction thereof. That is to say, the pincer leg 5a is also axially movable and the mechanical wear gauge 1 can be adapted to the thickness of the brake disc 22. The pincer leg 3a of the measuring arm 3 is rigid, therefore non-movable. The measuring arm 3 has a clamp 9 by way of which the sliding member 5 is secured to the measuring arm 3. Both the measuring arm 3 and the sliding member 5 partially have a curvature. The curvature is constructed and provided to allow for measure of the brake disc thickness without a bolt 26 having to be disassembled. At the end of the sliding member 5 facing the base member 2, a first auxiliary sliding member 14 in the form of a lateral formation is formed, by way of which the user can adjust the sliding member 5. There is arranged on the measuring arm 3, at the side opposite the first auxiliary sliding member 14, a second auxiliary sliding member 13, to which the user can apply a force which is directed counter to the first auxiliary sliding member 14 and fixes the mechanical wear gauge in position.

The position of the sliding member 5 can be adjusted in a variable manner by means of a fixing screw 6 on the base member 2 and by means of a fixing screw 6a on the measuring arm 3. The fixing screws 6, 6a are guided through elongate holes 15, 15a of the base member 2 and the measuring arm 3 and are each locked by way of a counter-nut which is not shown. Between the fixing screws 6, 6a, in the base member 2, a brake disc wear indicator 7 in the form of an elongate hole is formed, so that the sliding member 5 is visible with a marking 17. In addition, there is arranged on the base member 2, at the side of the brake disc wear indicator 7, a brake disc wear scale 7a by way of which the actual brake disc wear can be read by way of the marking 17 of the sliding member 5. At the side of the base member 2 opposite the sliding member 5 for measuring the brake disc wear, a sliding member 4, referred to also as a second sliding member 4, for measuring a brake liner wear (PW) shown in FIG. 2 is arranged. The sliding member 4 is secured to the base member 2 by way of a resilient connection 12. The resilient connection 12 is formed from the base member 2 and comprises two U-shaped receiving members 12a, 12b in which the second sliding member 4 rests. Between the U-shaped receiving members 12a, 12b, the second sliding member 4 is clamped with tensioning by the base member 2 and prevents the second sliding member 4 from radially falling out of the base member 2 of the mechanical wear gauge 1. The second sliding member 4 extends along the longitudinal axis A of the base member 2. The end of the second sliding member 4 opposite the base member 2 is in the form of a hook 10. The hook 10 serves to increase a contact face 11 of the second sliding member 4. In order to read the brake liner wear, a brake liner wear indicator 8 having a brake liner wear scale 8a is arranged centrally between the U-shaped receiving members 12a, 12b of the resilient connection 12 on the base member 2. The brake liner wear indicator 8 is in the form of an elongate hole. In the region of the brake liner wear indicator 8, there is arranged on the second sliding member 4 a marking 18 by way of which the user can measure the actual brake liner wear state using the brake liner wear scale 8a. The base member 2 of the sliding member 5, for measuring the brake liner wear PW, and the sliding members 4, for measuring the brake disc wear DW, can be displaced relative to each other.

FIG. 2 illustrates the mechanical wear gauge 1 according to FIG. 1 during a measurement operation on a brake disc 20 of a wheel 30. The wheel 30 is arranged on a vehicle axle 40 of a vehicle 50. The measurement operation of the brake liner wear measurement and the measurement operation of the brake disc wear measurement will be explained in greater detail below. Firstly, the mechanical wear gauge 1 is guided between a brake liner carrier 24 of the disc brake 20 and a caliper 25 of the disc brake 20. The pincer leg 3a of the measuring arm 3a is placed on the brake disc 22 and the sliding member 5 for measuring the brake disc wear DW is displaced axially in the direction of the brake disc 22 until the pincer leg 5a of the sliding member 5 abuts the brake disc 22, so that the brake disc 22 is enclosed between the pincer leg 5a of the sliding member 5 and the pincer leg 3a of the measuring arm 3. Subsequently, the fixing screws 6, 6a are tightened, wherein the mechanical wear gauge 1 is centered on the brake disc 22. The second sliding member 4 for measuring the brake liner wear PW is pushed out with the contact face 11 thereof until the contact face 11 comes into contact with a bolt cover 23 in the direction of the longitudinal axis A of the base member 2. Via the displacement of the caliper 25 relative to the brake disc 22 in the event of a brake liner wear PW of a reaction-side brake liner 21, this brake liner wear PW can be measured. Field tests have shown that the brake liner wear PW of a brake-application-side brake liner 21a has substantially identical brake liner wear values to the reaction-side brake liner 21. Finally, during the measurement operation, the brake liner wear PW of the reaction-side brake liner 21 is read via the brake liner wear scale 8a and the brake disc wear DW of the reaction-side brake liner 21 is read via the brake disc wear scale 7a. The reading of the brake liner wear scale 8a and the reading of the brake disc wear scale 7a can also be carried out by removing the mechanical wear gauge 1 with tightened fixing screws 6, 6a.

LIST OF REFERENCE NUMERALS AS PART OF THE DESCRIPTION

1 Mechanical wear gauge
2 Base member
3 Measuring arm
3a Pincer leg of the measuring arm 3
4 Second sliding member for measuring the brake liner wear (PW)
5 Sliding member for measuring the brake disc wear (DW)
5a Pincer leg of the sliding member 5
6, 6a Fixing screws
7 Brake disc wear indicator of the base member 2
7a Brake disc wear scale of the brake disc wear indicator 7
8 Brake liner wear indicator of the base member 2
8a Brake liner wear scale of the brake liner wear indicator 8
9 Clamp
10 Hook of the second sliding member 4
11 Contact face of the second sliding member 4
12 Resilient connection of the base member 2
12a,b U-spaced receiving members of the resilient connection 12
13 Auxiliary sliding member of the measuring arm 3
14 Auxiliary sliding member of the sliding member 5
15, 15a Elongate hole
17 Marking of the sliding member 5
18 Marking of the second sliding member 4
20 Disc brake
21 Reaction-side brake liner
21a Brake-application-side brake liner
22 Brake disc
23 Bolt cover
24 Brake liner carrier
25 Caliper
26 Bolt
30 Wheel of the vehicle axle 40
40 Vehicle axle of the vehicle 50
50 Vehicle
A Longitudinal axis of the base member 2
DW Brake disc wear
PW Brake liner wear
OV Overlap region of the measuring arm 3

The invention claimed is:

1. A mechanical wear gauge (1) for detecting a wear (W) on a disc brake (20) of a wheel (30), wherein the wheel (30) is arranged on a vehicle axle (40) of a vehicle (50), wherein the disc brake (20) has two brake liners (21, 21a) and a brake disc (22) which is arranged between the brake liners (21, 21a), the mechanical wear gauge comprising:
a brake liner wear (PW) detection mechanism (4, 8, 8a, 10, 11) that detects a brake liner wear (PW) and a brake disc wear detection mechanism (3, 3a, 5, 5a, 6, 7, 7a) that detects a brake disc wear (DW).

2. Mechanical wear gauge (1) according to claim 1, wherein the mechanical wear gauge (1) carries out, on the wheel (30) which is securely connected to the vehicle axle (40), a brake liner wear measurement of the brake liner wear (PW) and a brake disc wear measurement of the brake disc wear (DW).

3. Mechanical wear gauge (1) according to claim 1, wherein the mechanical wear gauge (1) comprises:
a base member (2) and first and second sliding members (5, 4) which are arranged in parallel on the base member (2) and which move axially along a longitudinal axis (A) of the base member (2).

4. Mechanical wear gauge (1) according to claim 3, wherein the base member (2) includes a measuring arm (3).

5. Mechanical wear gauge (1) according to claim 4, wherein the first sliding member (5) is arranged in an overlap region (OV) of the measuring arm (3).

6. Mechanical wear gauge (1) according to claim 4, wherein the measuring arm (3) has a first pincer leg (3) which is arranged at the end of the measuring arm (3) opposite the base member (2), and the first sliding member (5) has a second pincer leg (5a) which is arranged parallel with the first pincer leg (3a), and wherein the pincer legs (3a, 5a) receive the brake disc (12) therebetween during a brake disc wear measurement.

7. Mechanical wear gauge (1) according to claim 3, wherein the first sliding member (5) is lockable on the base member (2) against sliding movement via two fixing screws (6, 6a).

8. Mechanical wear gauge (1) according to claim 3, wherein the base member (2) includes a brake disc wear indicator (7) having a brake disc wear scale (7a) for reading a brake disc wear (DW) measurement based on a position of the sliding member (5) relative to the base member (2).

9. Mechanical wear gauge (1) according to claim 3, wherein the base member (2) includes a brake liner wear indicator (8) having a brake liner wear scale (8a) for reading a brake liner wear (PW) wear measurement based on a position of the second sliding member (4) relative to the base member (2).

10. Mechanical wear gauge (1) according to claim 3, wherein an end of the second sliding member (4) opposite the base member (2) is in the form of a hook (10).

11. Mechanical wear gauge (1) according to claim 10, wherein the hook (10) has a contact face (11) for bringing the second sliding member (4) into contact with a bolt cover (23) of the disc brake.

12. Mechanical wear gauge (1) according to claim 3, wherein the base member (2) includes a resilient connection (12) at a side opposite the measuring arm (3), and the second sliding member (4) is attached to the base member (2) via the resilient connection (12).

13. Mechanical wear gauge (1) according to claim 1, wherein the mechanical wear gauge (1) is produced from metal or plastics material.

14. Mechanical wear gauge (1) according to claim 1, wherein the mechanical wear gauge (1) has an overall thickness between 5 mm and 15 mm.

15. The mechanical wear gauge of claim 1, wherein the mechanical wear gauge is arranged on a vehicle (50) having a vehicle axle (40) and a wheel which is arranged on the vehicle axle (40), wherein the wheel (30) has a disc brake (20), two brake liners (21, 21a) and a brake disc (22) which is arranged between the brake liners (21, 21a).

16. The mechanical wear gauge of claim 3, wherein the measuring arm (3) and the first sliding member (5) each have a curvature for extending around a brake caliper that remains installed during measurement of the brake disc wear.

17. The mechanical wear gauge of claim 3, wherein the first sliding member (5) includes a first auxiliary sliding member (14) extending laterally from the first sliding member (5), and the measuring arm (3) includes a second auxiliary sliding member (13) extending laterally therefrom, wherein the first auxiliary sliding member applies a force on the first sliding member 5 toward a face of the brake disc, and the second auxiliary sliding member counteracts the force to clamp the brake disc between the first sliding member (5) and the measuring arm (3).

18. A method of detecting and measuring brake disc wear and brake liner wear of a wheel brake installed on a wheel installed on a vehicle axle, the method comprising:
   providing a mechanical wear gauge (1) having a base member (2) with a measuring arm (3) extending longitudinally therefrom, a first sliding member (5) that overlaps the measuring arm (3) and being slidable relative to the base member (2) and the measuring arm (3), and a second sliding member (4) connected to the base member (2) and slidable relative thereto;
   positioning a first pincer leg (3a) of the measuring arm on a first side of the brake disc;
   positioning a second pincer leg (5a) of the first sliding member on a second side of the brake disc;
   clamping the brake disc between the first and second pincer legs via sliding movement of the first sliding member (5) relative to the base member and the measuring arm; and
   sliding the second sliding member (4) into contact with a bolt cover;
   visibly detecting a brake disc wear measurement at the base member (2) based on a positioning of the first sliding member (5) relative to the base member (2);
   visibly detecting a brake liner wear measurement at the base member (2) based on a position of the second sliding member (4) relative to the base member (2).

19. The method of claim 18, further comprising locking the first sliding member (5) to the base member (2) after clamping the brake disc, wherein the first sliding member (5) is locked against sliding movement relative to the base member (2).

20. The method of claim 19, further comprising, after locking the first sliding member (5) to the base member (2), sliding the second sliding member (4) relative to a resilient connection (12) formed on the base member (2), wherein the resilient connection (12) holds the second sliding member (4) in place relative to the base member (2).

* * * * *